US012752408B2

(12) United States Patent
Yasutomi et al.

(10) Patent No.: US 12,752,408 B2
(45) Date of Patent: Oct. 6, 2026

(54) WORK MACHINE

(71) Applicant: Koki Holdings Co., Ltd., Tokyo (JP)

(72) Inventors: Toshinori Yasutomi, Ibaraki (JP); Takashi Kawamata, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 168 days.

(21) Appl. No.: 18/796,245

(22) Filed: Aug. 6, 2024

(65) Prior Publication Data

US 2025/0050483 A1 Feb. 13, 2025

(30) Foreign Application Priority Data

Aug. 10, 2023 (JP) ................................ 2023-130675

(51) Int. Cl.
*B25C 1/04* (2006.01)
*F16J 15/3204* (2016.01)

(52) U.S. Cl.
CPC .............. *B25C 1/047* (2013.01); *B25C 1/041* (2013.01); *F16J 15/3204* (2013.01)

(58) Field of Classification Search
CPC ......... B25C 1/041; B25C 1/044; B25C 1/047; B25C 1/06; B25C 7/00; F15B 15/1447; F15B 15/1452; F15B 21/00
USPC ..... 227/130; 92/153, 159, 222; 91/308, 356, 91/461
See application file for complete search history.

(56) References Cited

U.S. PATENT DOCUMENTS

| | | | | |
|---|---|---|---|---|
| 2,635,932 A * | 4/1953 | Heusser | F16J 9/063 | 277/440 |
| 3,738,231 A * | 6/1973 | Zurner | F16J 1/08 | 92/159 |
| 4,005,763 A * | 2/1977 | Wallis | F16F 9/3278 | 92/153 |
| 4,557,351 A * | 12/1985 | Volk | F01B 31/10 | 184/18 |
| 5,671,880 A * | 9/1997 | Ronconi | B25C 1/042 | 91/308 |
| 6,568,313 B2 * | 5/2003 | Fukui | F15B 15/1452 | 92/248 |
| 6,607,111 B2 * | 8/2003 | Garvis | B25C 1/06 | 173/124 |
| 8,011,547 B2 * | 9/2011 | Leimbach | B25C 1/041 | 227/129 |
| 10,927,953 B2 * | 2/2021 | Svrcek | F16J 1/08 | |

(Continued)

FOREIGN PATENT DOCUMENTS

WO 2018100943 6/2018

*Primary Examiner* — Anna K Kinsaul
(74) *Attorney, Agent, or Firm* — JCIPRNET

(57) ABSTRACT

A nailer includes a case part with hollow shape and a piston part. The case part includes a cylinder. The piston part defines a pressure chamber inside the case part and strikes a fastener by moving to a lower side due to a pressure of a gas in the pressure chamber. The piston part includes: a base member including a sidewall; an X-ring attached to the base member to be interposed between the sidewall and the cylinder; and an O-ring interposed between the sidewall and the cylinder and attached at a position different from the X-ring in an up-down direction. The X-ring includes a first base part and a lip part standing from the first base part and contacting the cylinder. The O-ring includes a second base part and does not include a lip part standing from the second base part.

14 Claims, 9 Drawing Sheets

(56) References Cited

U.S. PATENT DOCUMENTS

| | | | | |
|---|---|---|---|---|
| 11,413,734 | B2 * | 8/2022 | Bradley | F16J 1/08 |
| 2005/0279802 | A1 * | 12/2005 | Moeller | B25C 1/08<br>227/130 |
| 2018/0178361 | A1 * | 6/2018 | Kabbes | B25C 1/008 |
| 2022/0371167 | A1 * | 11/2022 | Bradley | B25C 7/00 |

* cited by examiner

WORK MACHINE

CROSS-REFERENCE TO RELATED APPLICATION

This application claims the priority benefit of Japan application serial no. 2023-130675, filed on Aug. 10, 2023. The entirety of the above-mentioned patent application is hereby incorporated by reference herein and made a part of this specification.

BACKGROUND

Technical Field

The disclosure relates to a work machine such as a nailer.

Related Art

As an example of a work machine, a driving tool includes a cylinder in a tubular shape, a piston that reciprocates in the cylinder, a striking part that strikes a fastener due to a downward movement of the piston, and a seal member provided at the piston.

As such a driving tool, for example, Patent Document 1 (International Publication No. 2018/100943) discloses a work machine (driving tool) in which an X-ring is provided at the piston as the seal member.

In the driving tool described in Patent Document 1, the X-ring is provided at the piston as the seal member to suppress air leakage at a contact surface between the piston and the cylinder. However, at a low temperature, the X-ring hardens, which may reduce the sealing performance of the X-ring.

The decrease in the sealing performance of the X-ring at a low temperature may be improved by increasing a tightening margin (a ratio of a compression amount to a wire diameter of the X-ring) of the X-ring against a cylinder inner wall. However, in that case, a lubricant applied to the cylinder inner wall is scraped out, and oil film breakage occurs at a normal temperature. When oil film breakage occurs, the sealing performance enhanced by the oil film decreases, causing air leakage.

When air leakage occurs, an operator needs to interrupt the driving work to replenish air, and as a result, the convenience of the driving tool may be impaired.

SUMMARY

A work machine according to an embodiment includes a case part with hollow shape and a piston part. The case part includes a cylinder, the cylinder being in a tubular shape extending in a first direction and including an inner wall. The piston part is capable of moving in the first direction inside the cylinder. The piston part cooperates with the case part to define a pressure chamber inside the case part, and strikes a fastener by moving to one side in the first direction due to a pressure of a gas inside the pressure chamber. The piston part includes a base member, a first seal member, and a second seal member. The base member includes a sidewall facing the inner wall of the cylinder. The first seal member is attached to the base member to be interposed between the sidewall and the inner wall. The second seal member is attached to the base member to be interposed between the sidewall and the inner wall, and is arranged at a position different from the first seal member in the first direction. In a cross-sectional view at a cut plane parallel to the first direction, the first seal member includes a first base part and a lip part standing from the first base part and contacting the cylinder. In the cross-sectional view, the second seal member includes a second base part and does not include a lip part standing from the second base part.

According to the disclosure, the convenience of the work machine can be improved.

DESCRIPTION OF EMBODIMENTS

Figure 1:
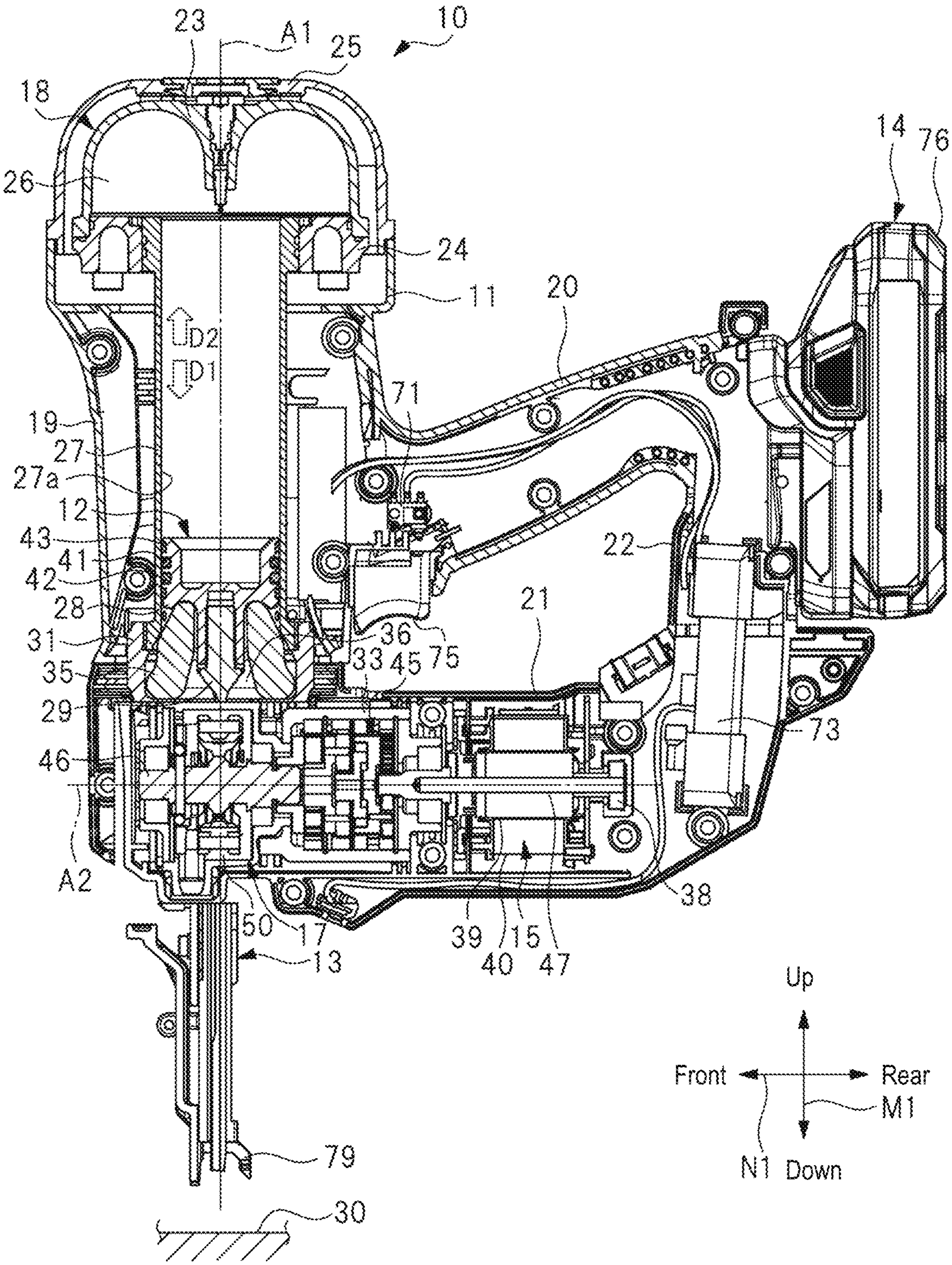
FIG. 1 is a cross-sectional view of a structure of a work machine according to an embodiment of the disclosure viewed from a lateral side.

Embodiments of the disclosure provide a work machine with improved convenience.

Referring to the drawings, a representative embodiment of a nailer (work machine) according to the disclosure will be described.

Embodiment

Figure 2:
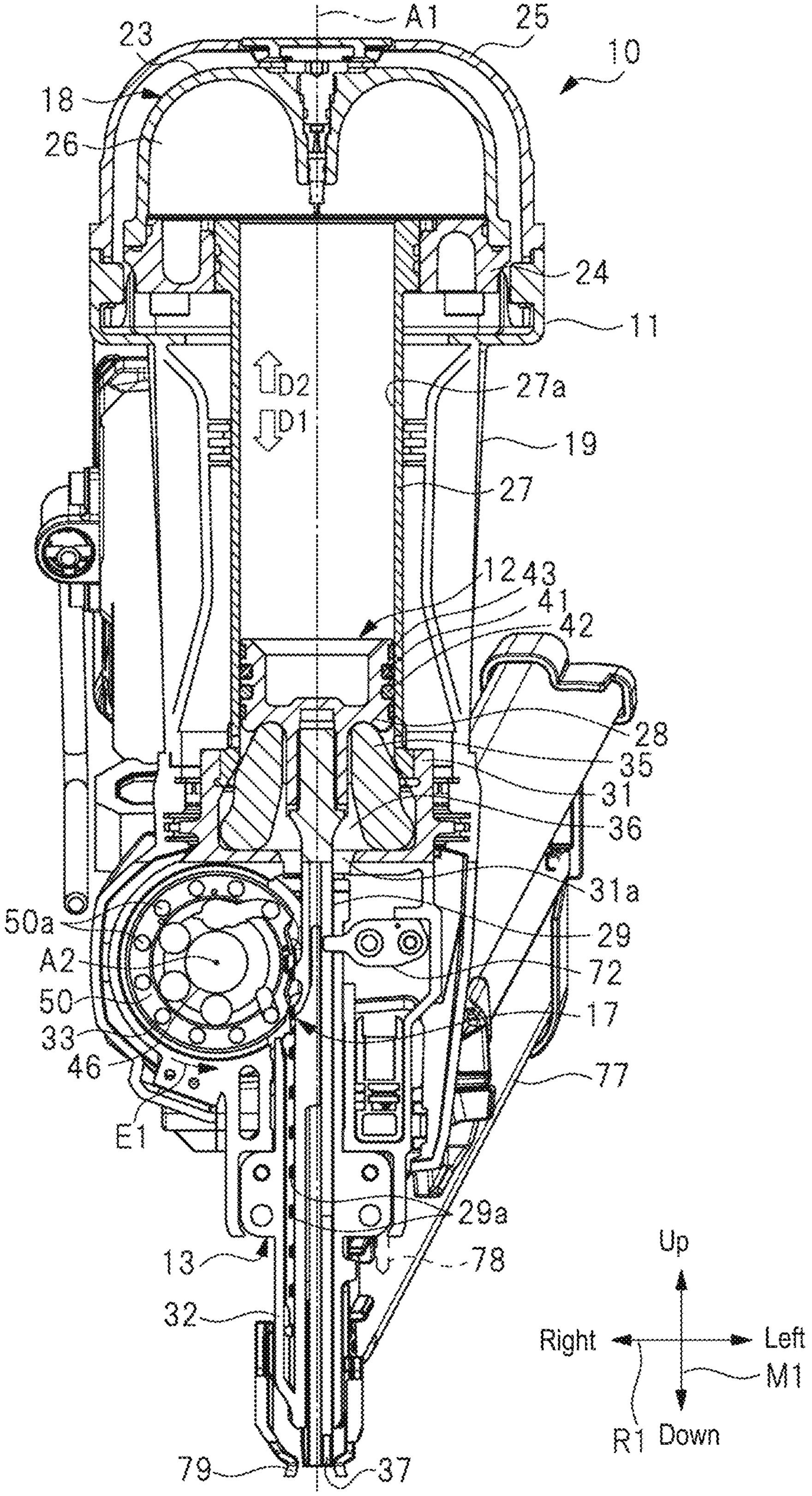
FIG. 2 is a cross-sectional view of the structure of the work machine shown in FIG. 1 viewed from a front side.

A nailer 10 shown in FIG. 1 and FIG. 2 is an air compression type work machine also referred to as a driving tool, and includes a housing 11, a striking part 12, a nose part 13, a power supply part 14, an electric motor 15, a winding mechanism 17, and a pressure storage container 18. The housing 11 is an outer shell element of the nailer 10 and includes a cylinder case 19, a handle 20, a motor case 21, and a mounting part 22. The cylinder case 19 has a tubular shape, and the handle 20 and the motor case 21 are connected to the cylinder case 19. Further, the mounting part 22 is connected to the handle 20 and the motor case 21.

The power supply part 14 is capable of being attached to and detached from the mounting part 22. The electric motor 15 is arranged in the motor case 21. A head cover 25 is provided at the cylinder case 19, and the pressure storage container 18 is arranged across an inside of the cylinder case 19 and an inside of the head cover 25.

Furthermore, a cylinder 27 in a tubular shape extending in an up-down direction (first direction) M1 is accommodated in the cylinder case 19. The pressure storage container 18 is a container that includes a cap 23 and a holder 24 attached to the cylinder 27 and closes an upper side (other side) end of the cylinder 27 in the up-down direction (first direction) M1, and an inside of the pressure storage container 18 communicates with an inside of the cylinder 27. The cylinder 27 is made of metal, for example, made of aluminum or iron. The cylinder 27 is positioned in a direction along a center line A1 and in a radial direction with respect to the cylinder case 19. The center line A1 passes through a center of the cylinder 27. The radial direction is a radial direction of a virtual circle centered on the center line A1.

Further, a pressure chamber 26 is formed across the inside of the pressure storage container 18 and the inside of the cylinder 27. Specifically, the pressure storage container 18 and the cylinder 27 are case parts with hollow shape, and compressed gas is filled in the pressure chamber 26 formed across the pressure storage container 18 and the cylinder 27. The compressed gas may be air or an inert gas. The inert gas includes, for example, nitrogen gas and rare gas. In this embodiment, an example in which air is filled in the pressure chamber 26 will be described. The pressure chamber 26 also serves as an urging part that urges the striking part 12 to a lower side (one side) in the up-down direction (first direction) M1.

The striking part 12 is arranged across from an inside to an outside of the housing 11. The striking part 12 includes a piston part 28 and a driver blade 29. The driver blade 29 is, for example, made of metal, non-ferrous metal, or steel. The piston part 28 and the driver blade 29 are provided as separate members, and the piston part 28 and the driver blade 29 are connected to each other.

The piston part 28 is capable of operating in a direction along the center line A1 in the cylinder 27. Specifically, the piston part 28 is capable of moving in the up-down direction (first direction) M1 inside the cylinder 27, and cooperates with the pressure storage container 18 and the cylinder 27 to define the pressure chamber 26 inside the pressure storage container 18 and the cylinder 27. The piston part 28 strikes a nail (fastener) 78 by moving to the lower side (one side) in the up-down direction (first direction) M1 due to a pressure of the compressed air in the pressure chamber 26. In other words, the striking part 12 composed of the piston part 28 and the driver blade 29 strikes the nail (fastener) 78 by moving to the lower side (one side) in the up-down direction (first direction) M1 due to the pressure of the compressed air in the pressure chamber 26.

A seal member in an annular shape is attached to an outer circumferential surface of the piston part 28 facing the cylinder 27. The seal member suppresses air leakage in the cylinder 27 by abutting against an inner wall 27*a* of the cylinder 27. The seal member attached to the piston part 28 will be described in detail later.

Further, the nose part 13 included in the nailer 10 is arranged across an inside and an outside of the cylinder case 19. The nose part 13 includes a bumper support part 31, an ejection part 32, and a tube part 33. The bumper support part 31 has a tubular shape. Further, a bumper 35 is arranged in the bumper support part 31. The bumper 35 may be made of synthetic rubber or silicone rubber. The bumper 35 has a guide hole 36. The center line A1 passes through the guide hole 36. The driver blade 29 is arranged in a guide hole 31*a* of the bumper support part 31 and in the guide hole 36.

The striking part 12 is capable of operating in a driving direction D1 and a return direction D2 along the center line A1. The driving direction D1 and the return direction D2 are directions opposite to each other. The driving direction D1 is a direction in which the piston part 28 approaches the bumper 35. The return direction D2 is a direction in which the piston part 28 separates from the bumper 35. The striking part 12 is constantly urged in the driving direction D1 by the gas pressure in the pressure chamber 26. Operation of the striking part 12 in the driving direction D1 may be defined as descending. Operation of the striking part 12 in the return direction D2 may be defined as ascending. The driving direction D1 is the same as the lower side (one side) in the up-down direction (first direction) M1. The return direction D2 is the same as the upper side (other side) in the up-down direction (first direction) M1.

Further, the ejection part 32 is connected to the bumper support part 31 and protrudes from the bumper support part 31 in a direction along the center line A1. The ejection part 32 has an ejection path 37, and the ejection path 37 is provided along the center line A1. The driver blade 29 is capable of operating in a direction along the center line A1 in the ejection path 37.

Further, the electric motor 15 is arranged in the motor case 21. The electric motor 15 includes a rotor 39 and a stator 40. The stator 40 is attached to the motor case 21. The rotor 39 is rotatably supported by the motor case 21 via a bearing 38. The electric motor 15 is, for example, a brushless motor, and when a voltage is applied to the electric motor 15, a motor shaft 47 rotates with the rotor 39 around a center line A2. As shown in FIG. 2, in a left-right direction R1, the center line A2 is at a position offset from the center line A1.

Furthermore, a reduction mechanism 45 is provided in the motor case 21. The reduction mechanism 45 includes a plurality of sets of planetary gear mechanisms. A rotation shaft 46 connected to the motor shaft 47 is provided in the tube part 33. The rotation shaft 46 and the reduction mechanism 45 are concentrically arranged around the center line A2. The reduction mechanism 45 is arranged in a power transmission path extending from the electric motor 15 to the rotation shaft 46, and is a mechanism that reduces rotation of the rotor 39 of the electric motor 15 and transmits the rotation to the winding mechanism 17.

The winding mechanism 17 is a mechanism that converts a rotational force of the rotation shaft 46 into a force that urges the striking part 12 in the return direction D2. As shown in FIG. 2, the winding mechanism 17 includes a driver blade 29, a plurality of racks 29*a* provided at the driver blade 29, a pinwheel 50 which is a rotation part, and a plurality of pins 50*a* provided at the pinwheel 50. When the pinwheel 50 rotates in a rotation direction E1 by a driving force of the electric motor 15, the plurality of pins 50*a* of the pinwheel 50 and the plurality of racks 29*a* of the driver blade 29 sequentially engage with each other, and the striking part 12 including the driver blade 29 is pushed up toward the upper side (return direction D2). A position detection switch 72 that detects a position of the driver blade 29 in the up-down direction (first direction) M1 is provided at the ejection part 32.

Further, as shown in FIG. 1, a trigger 75 and a trigger switch 71 are provided in the nailer 10. The trigger 75 and the trigger switch 71 are provided at the handle 20. The trigger switch 71 detects whether there is an operating force applied to the trigger 75 and outputs a signal according to the detection result.

The power supply part 14 includes an accommodating case 76 and a battery accommodated in the accommodating case 76. The battery includes a plurality of battery cells. The battery cells are secondary batteries capable of charging and discharging, and the battery cells may be any known battery cells such as lithium-ion batteries, nickel-hydrogen batteries, lithium-ion polymer batteries, nickel-cadmium batteries, etc.

The electric motor 15 operates by a power supplied from the battery mounted to the mounting part 22 of the housing 11. Further, a control part 73 is accommodated inside the mounting part 22. The control part 73 includes a microcomputer composed of a CPU, a ROM, a RAM, etc., and controls the electric motor 15. Specifically, the control part 73 changes a duty ratio of a motor current supplied to the electric motor 15 according to a control mode. That is, the control part 73 performs pulse width modulation (PWM) control on the electric motor 15.

Further, as shown in FIG. 2, a magazine 77 is provided in the nailer 10. The magazine 77 is supported by the ejection part 32 and the mounting part 22. Nails (fasteners) 78 are loaded in the magazine 77. The magazine 77 includes a feeder that sends the nails 78 in the magazine 77 to the ejection path 37. That is, the feeder moves the nails 78 in the magazine 77 to a front side in a front-rear direction Nl shown in FIG. 1. The ejection part 32 is made of metal or synthetic resin. A push lever 79 is attached to the ejection part 32. The push lever 79 is capable of operating within a predetermined range in a direction along the center line A1 with respect to the ejection part 32. An elastic member (not shown) is provided to urge the push lever 79 in a direction along the center line A1. The elastic member is, for example, a metal spring and urges the push lever 79 in a direction away from the bumper support part 31.

The push lever 79 is capable of switching ON and OFF upon being pressed against a target material 30 by an operator. When the push lever 79 is pressed against the target material 30 and moves upward against the urging of the spring, a signal is outputted. Further, when the operator operates the trigger 75, the trigger switch 71 built in the handle 20 operates, and a signal for a driving action is outputted.

When both the signal due to the operation of the push lever 79 and the signal due to the operation of the trigger 75 are inputted, the control part 73 supplies a motor current to the electric motor 15 and causes the electric motor 15 to operate. Accordingly, the pinwheel 50 is rotationally driven, the driver blade 29 is pushed up, and the piston part 28 moves from a bottom dead center to a top dead center. Then, the driver blade 29 provided at the piston part 28 is disengaged from the pinwheel 50 at the top dead center and is released. Due to the air pressure from the pressure chamber 26 together with release of the driver blade 29, the striking part 12 including the driver blade 29 starts descending and moves from the top dead center toward the bottom dead center. That is, the striking part 12 composed of the piston part 28 and the driver blade 29 reciprocates once between the bottom dead center and the top dead center, and accordingly, the nail 78 is struck by the driver blade 29 and the nail 78 is driven out.

Figure 3:
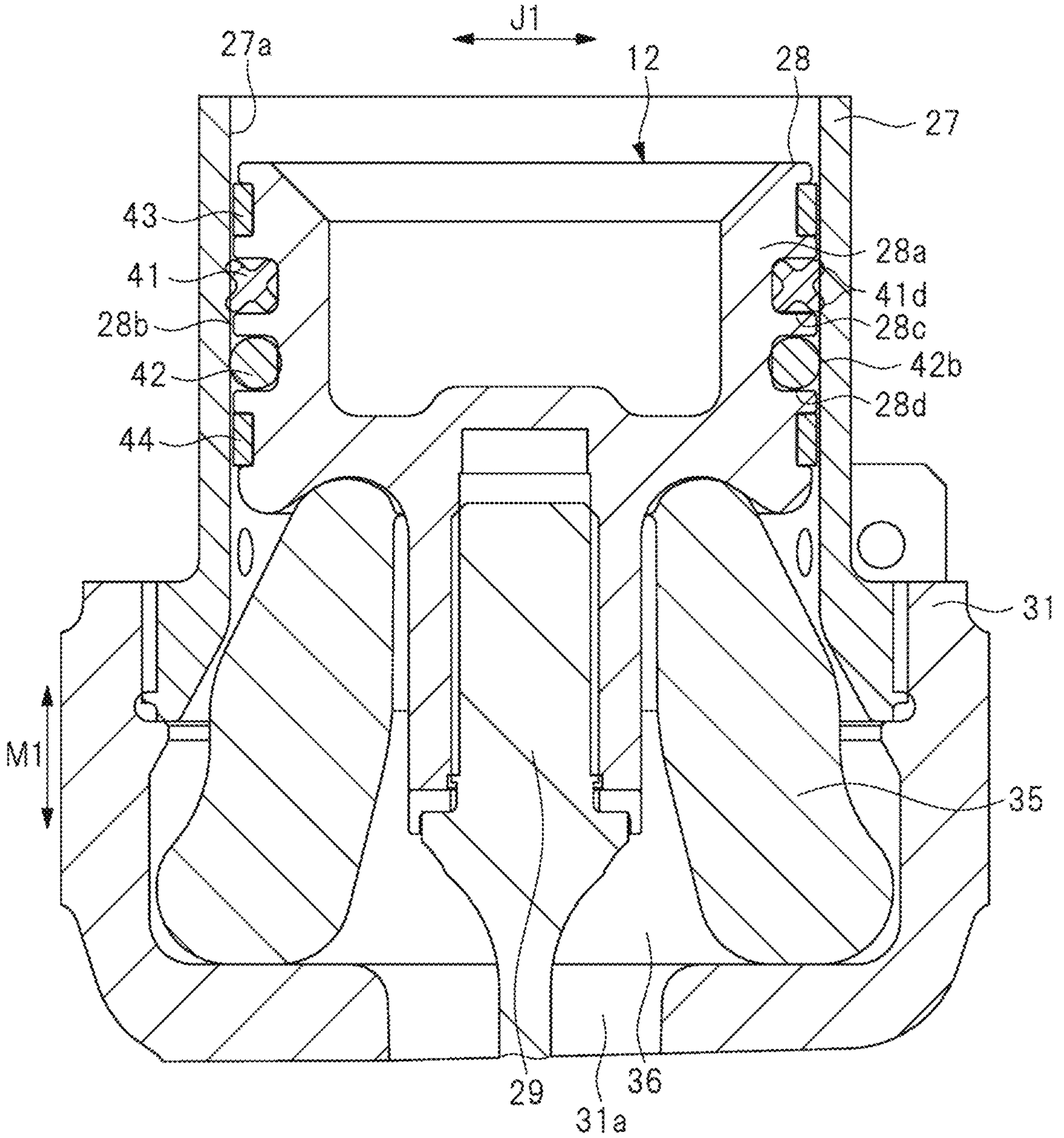
FIG. 3 is a partially enlarged cross-sectional view showing a structure of a piston assembled to the work machine shown in FIG. 1 and a periphery of the piston.
Figure 4:
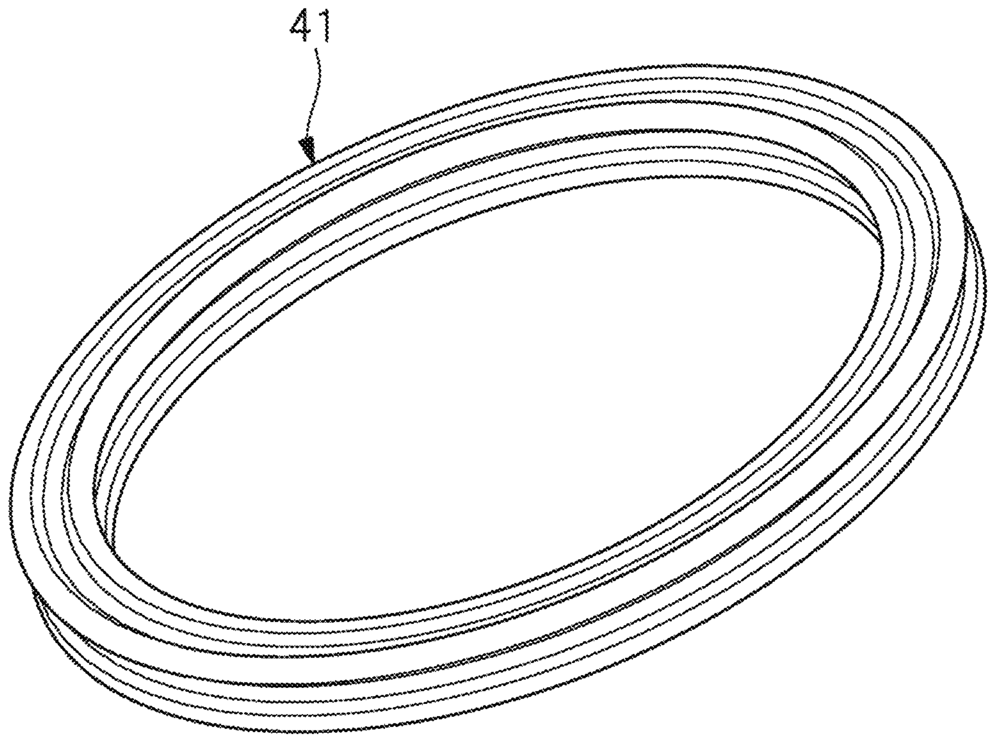
FIG. 4 is a perspective view showing a shape of an X-ring provided at the piston shown in FIG. 3.
Figure 5:
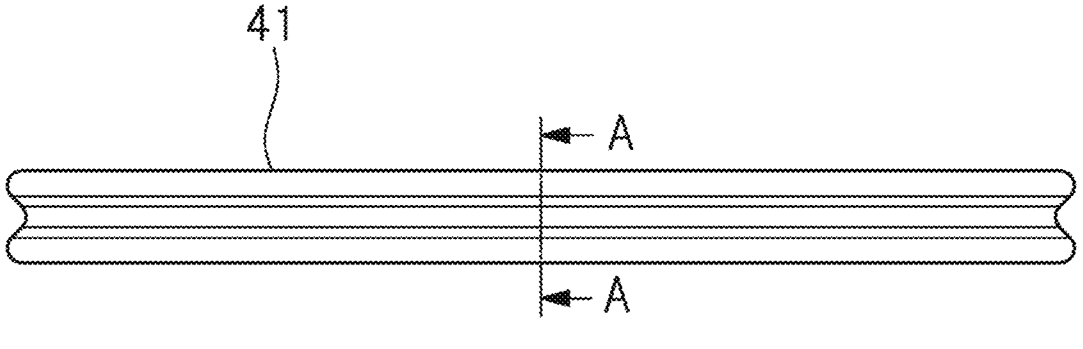
FIG. 5 is a side view showing the shape of the X-ring shown in FIG. 4.
Figure 6:
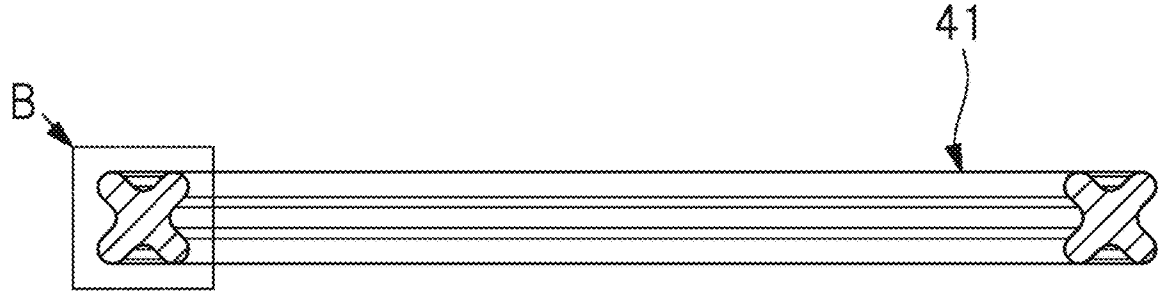
FIG. 6 is a cross-sectional view showing a structure cut along line A-A in FIG. 5.

Next, the seal member provided at the piston part 28 of the nailer 10 will be described. As shown in FIG. 3, the piston part 28 includes a base member 28*a* having a sidewall 28*b* facing the inner wall 27*a* of the cylinder 27. Furthermore, the piston part 28 includes a first seal member that is attached to the base member 28*a* to be interposed between the sidewall 28*b* and the inner wall 27*a*, and a second seal member that is attached to the base member 28*a* to be interposed between the sidewall 28*b* and the inner wall 27*a* and is arranged at a position different from the first seal member in the up-down direction (first direction) M1.

In this embodiment, an X-ring 41 is adopted as an example of the first seal member, and an O-ring 42 is adopted as an example of the second seal member for illustration. That is, the X-ring 41 and the O-ring 42 are attached to the sidewall 28*b* of the base member 28*a* of the piston part 28 as seal members for the cylinder 27. Slide rings 43 and 44 are attached to the sidewall 28*b* of the base member 28*a* of the piston part 28 to suppress inclination of the piston part 28 during sliding.

As shown in FIG. 4 to FIG. 7, the X-ring 41 is a ring-shaped elastic member having a cross-sectional shape formed into an X shape. On the other hand, as shown in FIG. 8, the O-ring 42 is a ring-shaped elastic member having a cross-sectional shape formed into an O shape.

Figure 7:
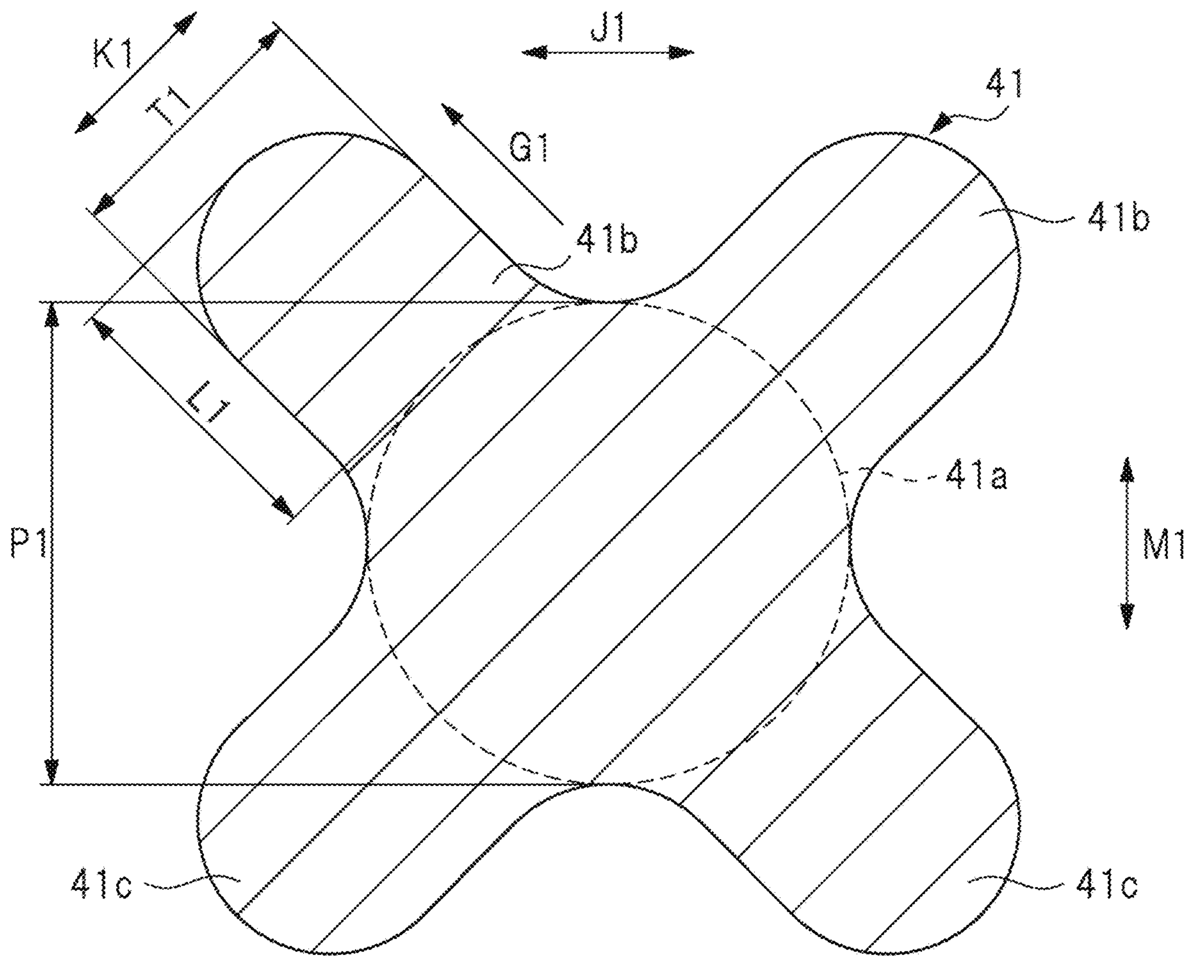
FIG. 7 is an enlarged cross-sectional view showing a structure of a B part in FIG. 6.

In a cross-sectional view at a cut plane parallel to the up-down direction (first direction) M1 shown in FIG. 7, the X-ring 41 includes a base part (first base part) 41*a* in a circular shape and lip parts 41*b* and 41*c* standing from the circular base part 41*a* and contacting the cylinder 27 in FIG. 3. That is, the X-ring 41 has a cross-sectional shape in which the circular base part 41*a* is arranged at a center of an X-shaped cross-section, and four lip parts 41*b* and 41*c* stand to protrude in four directions from the circular base part 41*a*. Specifically, the X-ring 41 includes two lip parts 41*b* that protrude from the circular base part 41*a* obliquely to the upper direction in the up-down direction (first direction) M1, and two lip parts 41*c* that protrude from the circular base part 41*a* obliquely to the lower direction in the up-down direction (first direction) M1.

Figure 8:
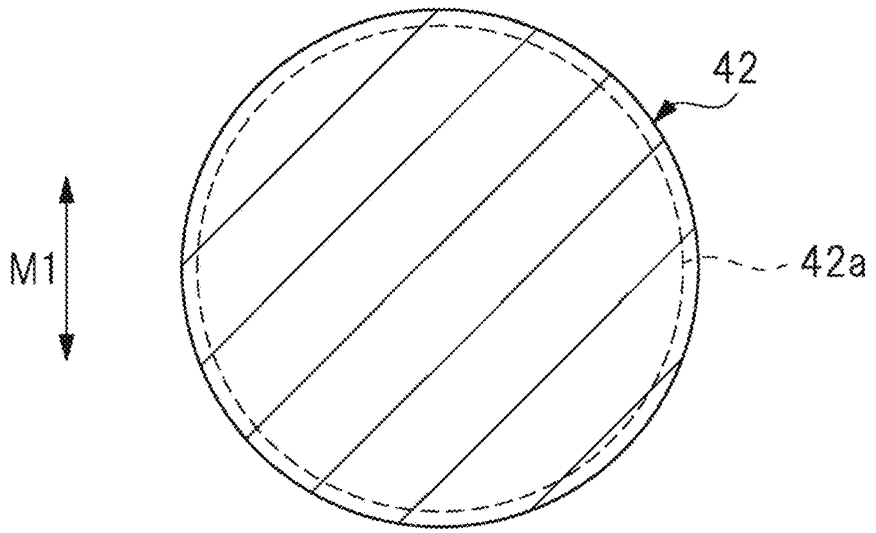
FIG. 8 is a cross-sectional view showing a shape of an O-ring provided at the piston shown in FIG. 3.

On the other hand, in a cross-sectional view at a cut plane parallel to the up-down direction (first direction) M1 shown in FIG. 8, the O-ring 42 includes a base part (second base part) 42*a* in a circular shape and does not include lip parts standing from the base part 42*a*. That is, the O-ring 42 has a cross-sectional shape that only includes the circular base part 42*a* and does not include lip parts protruding from the circular base part 42*a*.

As shown in FIG. 3, at the sidewall 28*b* of the base member 28*a* of the piston part 28, the X-ring 41 is attached to a groove 28*c* provided on an upper side of the sidewall 28*b* in the up-down direction (first direction) M1, and the O-ring 42 is attached to a groove 28*d* provided on a lower side of the sidewall 28*b* in the up-down direction (first direction) M1.

In other words, at the sidewall 28*b* of the base member 28*a* of the piston part 28, the X-ring 41 is attached at a position closer to the pressure chamber 26 (see FIG. 1) than the O-ring 42, and the O-ring 42 is attached at a position farther from the pressure chamber 26 than the X-ring 41.

An abutment force of the X-ring 41 against the cylinder 27 is greater than an abutment force of the O-ring 42 against the cylinder 27. In other words, the X-ring 41 abuts against the cylinder 27 at a pressure greater than the O-ring 42. For example, a tightening margin of the X-ring 41 against the cylinder 27 is greater than a tightening margin of the O-ring 42 against the cylinder 27.

Figure 9:
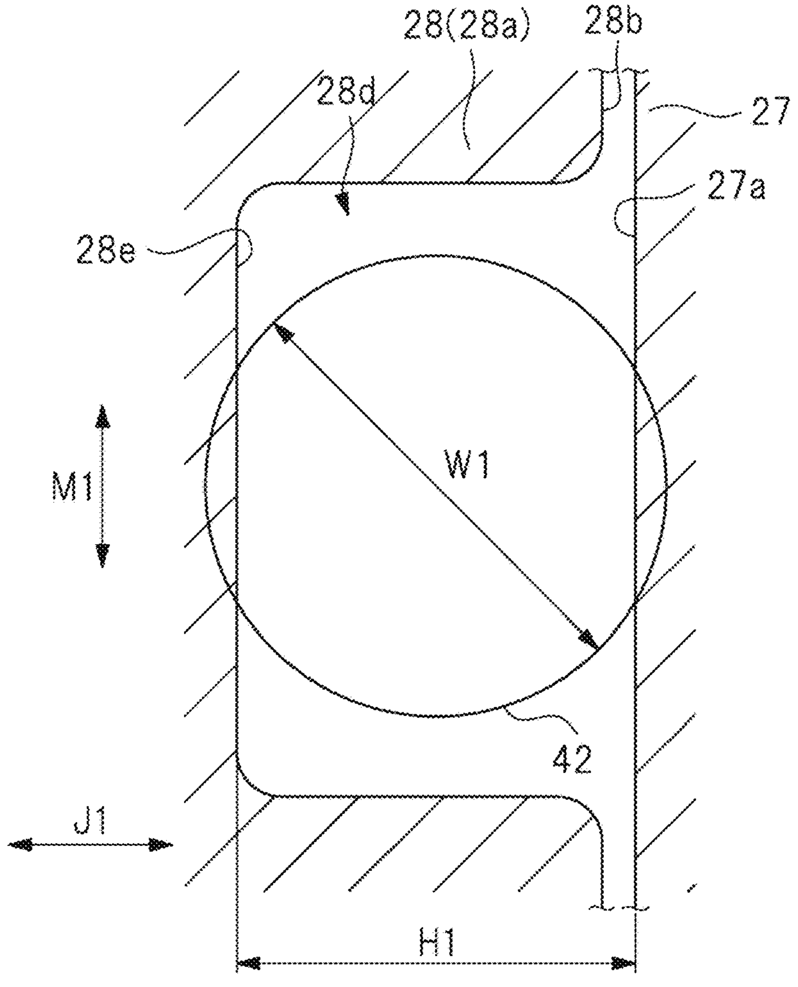
FIG. 9 is a partial cross-sectional view showing a tightening margin of the O-ring shown in FIG. 8.

Herein, the tightening margin of each of the seal members will be described. First, referring to FIG. 9, the tightening margin of the O-ring 42 will be described. The tightening margin of the O-ring 42 is expressed as a tightening margin ratio by the following formula. Tightening margin ratio=(W1−H1)/W1 . . . . Formula (1). In this case, W1 is a wire diameter of the O-ring 42, and H1 is a height (depth) from a bottom surface 28*e* of the groove 28*d*. Regarding the wire diameter W1 of the O-ring 42, wire diameters are calculated according to Formula (2) and Formula (3) below, with which a volume (volume after deformation) after expanding the inner diameter of the O-ring 42 and a volume (volume before deformation) before expanding the inner diameter of the O-ring 42 are equal. Volume before deformation: $2\times n^2\times W^2$ (O-ring inner diameter+W) . . . . Formula (2), where W is the wire diameter of the O-ring 42 before deformation. Volume after deformation: $2\times n^2\times Z^2$ (piston inner diameter+Z) . . . . Formula (3), where Z is the wire diameter of the O-ring 42 after deformation.

With Formula (2)=Formula (3), a ratio of the wire diameter Z after deformation to the wire diameter W before deformation is calculated, and by multiplying this ratio by an actual size of the wire diameter of the O-ring 42 before deformation, the wire diameter W1 of the O-ring 42 is calculated.

For example, assume that the actual wire diameter of the O-ring 42 before deformation is 3.5 mm and the height (depth) H1 of the groove 28*d* is 3.225 mm. Herein, the O-ring inner diameter and the piston inner diameter are predetermined values provided in advance. In this case, with Formula (2)=Formula (3), the ratio of the wire diameter Z after deformation to the wire diameter W before deformation is calculated, and by multiplying this ratio by the actual size of the wire diameter of the O-ring 42 before deformation, the wire diameter W1 of the O-ring 42 is calculated as 3.382. Thus, according to Formula (1), the tightening margin ratio of the O-ring 42 is calculated as 4.64.

The tightening margin ratio of the X-ring 41 may also be calculated in a manner similar to the O-ring 42. For example, assume that the actual wire diameter of the X-ring 41 before deformation is 3.5 mm and the height (depth) H1 of the groove 28*c* is 3.225 mm. Herein, the X-ring inner diameter and the piston inner diameter are predetermined values provided in advance. In this case, with Formula (2)=Formula (3), the ratio of the wire diameter Z after deformation to the wire diameter W before deformation is calculated, and by multiplying this ratio by the actual size of the wire diameter of the X-ring 41 before deformation, the wire diameter W1 of the X-ring 41 is calculated as 3.489. Thus, according to Formula (1), the tightening margin ratio of the X-ring 41 is calculated as 7.57.

In other words, with the tightening margin ratio of the X-ring 41 being greater than the tightening margin ratio of the O-ring 42, it is learned that the tightening margin of the X-ring 41 is greater than the tightening margin of the O-ring 42.

By configuring the tightening margin of the X-ring 41 to be greater than the tightening margin of the O-ring 42 as described above, the abutment force of the X-ring 41 against the cylinder 27 can be configured to be greater than the O-ring 42. Accordingly, a surface pressure at a seal surface 41*d* of the X-ring 41 against the cylinder 27 shown in FIG. 3 can be configured to be greater than a surface pressure at a seal surface 42*b* of the O-ring 42 against the cylinder 27. As a result, the sealing performance of the X-ring 41 at a low temperature can be enhanced, and occurrence of air leakage at a low temperature can be suppressed. However, if the X-ring 41 alone is arranged, there would be a concern that oil film breakage would occur at room temperature.

Thus, in the nailer 10 according to this embodiment, in addition to the X-ring 41, the O-ring 42 is further attached to the piston part 28.

The O-ring 42 is attached, with its tightening margin being smaller than that of the X-ring 41. If the tightening margin is small, since the surface pressure at the seal surface 42*b* is smaller than the surface pressure at the seal surface 41*d* of the X-ring 41, the scraping out of the lubricant can be suppressed. Further, the O-ring 42 acts as a stopper that prevents the lubricant scraped out downward by the X-ring 41 from being scraped out to below the O-ring 42, and holds the lubricant between the X-ring 41 and the O-ring 42. Accordingly, occurrence of oil film breakage at room temperature can be suppressed, and the sealing performance can be enhanced by the oil film also at room temperature. As a result, air leakage caused by a decrease in the sealing performance due to oil film breakage at room temperature can be suppressed by the O-ring 42.

In other words, in the nailer 10, by combining the X-ring 41 having a greater tightening margin and the O-ring 42 having a smaller tightening margin in comparison with each other and attaching them to the piston part 28, the sealing performance at a low temperature is enhanced by the X-ring 41, oil film breakage at room temperature is suppressed by the O-ring 42 to secure the sealing performance, and accordingly, air leakage at room temperature can be suppressed by the O-ring 42.

The tightening margin of the X-ring 41 in the nailer 10 of this embodiment is set to be greater than the tightening margin of the O-ring 42, but smaller than a tightening margin of an X-ring of a conventional nailer in which a single X-ring is attached to a piston. That is, in the nailer 10 of this embodiment, the tightening margins of both the X-ring 41 and the O-ring 42 are set to be smaller than the tightening margin of the X-ring of a conventional nailer.

Further, the X-ring 41 is preferably composed of a material with a mechanical strength and a wear resistance higher than the O-ring 42. Examples of the material forming the X-ring 41 may include hydrogenated nitrile rubber (HNBR). Hydrogenated nitrile rubber has both a high pressure resistance and a high mechanical strength and is a material ideal for a high-pressure part and a sliding part requiring wear resistance. By forming the X-ring 41 by a material with a mechanical strength and a wear resistance higher than the O-ring 42, the strength of the X-ring 41 can be secured, and the sealing performance at room temperature and a low temperature can be enhanced over a long period of time.

On the other hand, the O-ring 42 is preferably composed of a material with a cold resistance higher than the X-ring 41. Examples of the material forming the O-ring 42 may include ethylene propylene rubber (EPDM). Ethylene propylene rubber has a low brittleness temperature, and is thus a material capable of maintaining its strength even at a low temperature. By forming the O-ring 42 by a material with a cold resistance higher than the X-ring 41, the sealing performance at a low temperature can be further enhanced. The material forming the O-ring 42 may also be nitrile rubber (NBR). Nitrile rubber generally has a property of a cold resistance lower than ethylene propylene rubber, but by adjusting a blending ratio of the materials constituting the nitrile rubber to increase its hardness, its cold resistance can also be sufficiently enhanced.

Herein, the shape of the X-ring 41 will be described in detail. As shown in FIG. 7, in a cross-sectional view of the X-ring 41, the X-ring 41 includes a base part (first base part) 41*a* in a circular shape and four lip parts 41*b* and 41*c* protruding from the circular base part 41*a*. Among the four lip parts 41*b* and 41*c*, a protruding direction G1 of the two lip parts 41*b* protruding toward the upper side from the base part 41*a* is a direction inclined with respect to a radial direction J1 such that an outer side of the lip part 41*b* in the radial direction J1 of the cylinder 27 (see FIG. 1) is oriented toward the upper side (other side) in the up-down direction (first direction) M1. That is, the respective protruding directions G1 of the two lip parts 41*b* protruding from the base part 41*a* are obliquely upward directions different from each other. Similarly, the respective protruding directions of the two lip parts 41*c* protruding from the base part 41*a* are obliquely downward directions different from each other.

Further, in the cross-sectional view of the X-ring 41, a thickness T1 of the lip part 41*b* in an orthogonal direction K1 orthogonal to the protruding direction G1 in which the lip part 41*b* protrudes from the base part 41*a* is smaller than a short diameter P1 of the base part 41*a*. For example, T1=0.972 mm and P1=2.8 mm. Furthermore, in the cross-sectional view of the X-ring 41, a length L1 of the lip part 41*b* in the protruding direction G1 in which the lip part 41*b* protrudes from the base part 41*a* is equivalent to the thickness T1 of the lip part 41*b* in the orthogonal direction K1 orthogonal to the protruding direction G1. Specifically, the length L1 of the lip part 41*b* is in a range of plus or minus 20% of the thickness T1 of the lip part 41*b* or is greater than this range. For example, L1=0.872 mm.

Next, arrangements of the X-ring 41 and the O-ring 42 in the up-down direction (first direction) M1 will be described. As shown in FIG. 3, the X-ring 41 is attached to the groove 28*c* on the upper side of the O-ring 42 in the up-down direction (first direction) M1, and the O-ring 42 is attached to the groove 28*d* on the lower side of the X-ring 41 in the up-down direction (first direction) M1. Herein, as shown in FIG. 1, the pressure chamber 26 is provided above the cylinder 27 in the nailer 10. Thus, at the piston part 28, the X-ring 41 is attached at a position closer to the pressure chamber 26 than the O-ring 42, and the O-ring 42 is attached at a position farther from the pressure chamber 26 than the X-ring 41. The piston part 28 is pushed down by the air pressure from the pressure chamber 26. At this time, a large pressure due to the air from the pressure chamber 26 is applied to the seal member arranged on the upper side at the piston part 28.

Thus, in the nailer 10 of this embodiment, at the sidewall 28*b* of the base member 28*a* of the piston part 28, the X-ring 41 is arranged on a closer side (top dead center side) to the pressure chamber 26, and the O-ring 42 is arranged on a farther side (bottom dead center side) from the pressure chamber 26. Accordingly, by arranging the X-ring 41 on the top dead center side, the sealing performance of the piston part 28 can be secured even against a large pressure due to the air from the pressure chamber 26.

That is, the X-ring 41 is provided with two lip parts 41*b* that respectively protrude obliquely upward as shown in FIG. 7, and the two lip parts 41*b* respectively abut against the inner wall 27*a* of the cylinder 27 to mainly secure the sealing performance. At this time, when the air pressure from the pressure chamber 26 is applied to the X-ring 41 from the upper side, air enters the upper side of the X-ring 41, and the X-ring 41 is crushed downward. At this time, the X-ring 41 deforms such that a tip side of the lip part 41*b* protruding obliquely upward is spread toward the outer side. That is, the two lip parts 41*b* deform to more strongly abut against the inner wall 27*a* of the cylinder 27. As a result, the surface pressure of the X-ring 41 against the inner wall 27*a* of the cylinder 27 becomes higher, and the sealing performance of the X-ring 41 can be further enhanced. In other words, by arranging the X-ring 41 on the top dead center side, the surface pressure of the X-ring 41 against the cylinder 27 can be further increased, and the sealing performance of the piston part 28 can be further enhanced.

Since the X-ring 41 has a tightening margin already configured to be greater than the O-ring 42 to increase the surface pressure, by further increasing the surface pressure, the sealing performance can be enhanced also at a low temperature in particular. As a result, air leakage can be suppressed even at a low temperature. As described above, by arranging the X-ring 41 on the top dead center side, the surface pressure can be further increased, and the sealing performance at a low temperature can be enhanced.

On the other hand, in that case, there is a concern that oil film breakage of the lubricant would occur at room temperature. However, in the nailer 10 of this embodiment, the O-ring 42 is arranged on the bottom dead center side. On the bottom dead center side, the surface pressure does not become large due to a large pressure resulting from the air from the pressure chamber 26 as in the case of the X-ring 41 described above. Furthermore, since the O-ring 42 has a tightening margin also set to be smaller than the X-ring 41, the surface pressure of the O-ring 42 itself is small. Accordingly, it is difficult for oil film breakage to occur at the O-ring 42. Furthermore, in terms of the shape as well, since the O-ring 42 has a circular shape without lip parts, its contact surface with the cylinder 27 is also small, and it is less likely for oil film breakage to occur than the X-ring 41. That is, it is difficult for oil film breakage to occur at the O-ring 42 arranged on the bottom dead center side. Further, the O-ring 42 acts as a stopper that prevents the lubricant scraped out downward by the X-ring 41 from being scraped out to below the O-ring 42, and holds the lubricant between the X-ring 41 and the O-ring 42. As a result, oil film breakage at room temperature can be reduced to secure the sealing performance by the lubricant (oil film).

As described above, in the nailer 10 of this embodiment, by arranging a seal member (X-ring 41) having a higher surface pressure at a low temperature and arranging a seal member (O-ring 42) having a lower surface pressure at room temperature in comparison with each other, oil film breakage can be suppressed and the sealing performance can be secured. Accordingly, occurrence of air leakage can be suppressed, and the frequency for the operator to interrupt the driving work to replenish air can be reduced. That is, air leakage of the nailer 10 can be suppressed to use the nailer 10 for a long period of time. As a result, the convenience of the nailer 10 can be improved.

Next, modification examples of this embodiment will be described. In a first modification example shown in FIG. 10, a V-ring 48 is adopted instead of the X-ring 41 as the first seal member on the top dead center side of the sidewall 28*b* of the base member 28*a* of the piston part 28, and the O-ring 42 is attached on the bottom dead center side.

Figure 11:
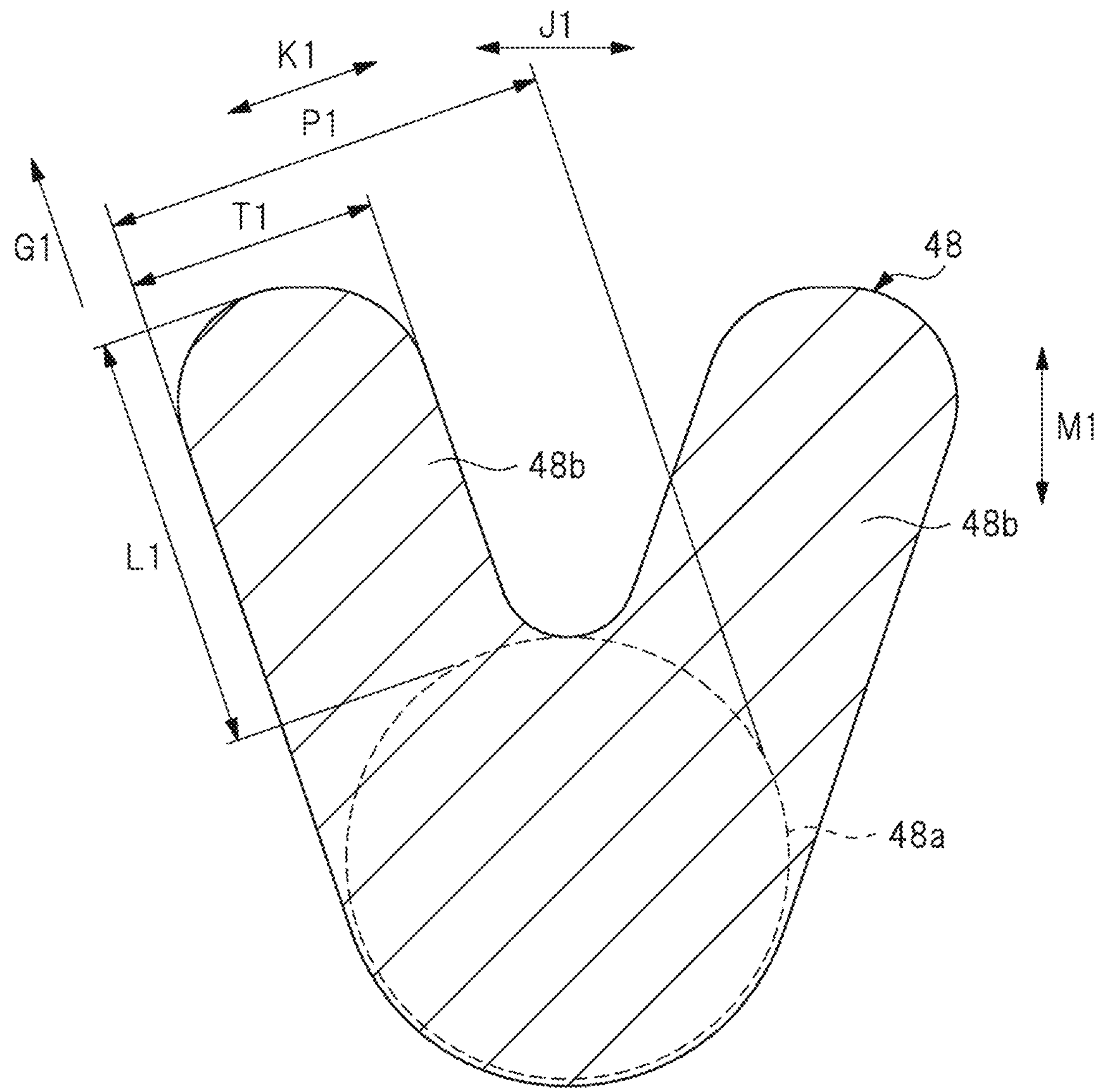
FIG. 11 is a partially enlarged cross-sectional view showing a shape of the seal member (V-ring) of the first modification example shown in FIG. 10.

As shown in FIG. 11, in a cross-sectional view of the V-ring 48, the V-ring 48 includes a base part (first base part) 48*a* in a circular shape arranged at a center of a V-shaped cross-section, and two lip parts 48*b* protruding in two directions from the circular base part 48*a*. The two lip parts 48*b* protrude toward the upper side. Specifically, protruding directions G1 of the two lip parts 48*b* protruding from the base part 48*a* are directions inclined with respect to a radial direction J1 such that an outer side of the lip part 48*b* in the radial direction J1 of the cylinder 27 (see FIG. 1) is oriented toward the upper side (other side) in the up-down direction (first direction) M1. That is, the respective protruding directions G1 of the two lip parts 48*b* protruding from the base part 48*a* are obliquely upward directions different from each other.

Further, in the cross-sectional view of the V-ring 48, a thickness T1 of the lip part 48*b* in an orthogonal direction K1 orthogonal to the protruding direction G1 in which the lip part 48*b* protrudes from the base part 48*a* is smaller than a short diameter P1 of the base part 48*a*. Furthermore, in the cross-sectional view of the V-ring 48, a length L1 of the lip part 48*b* in the protruding direction G1 in which the lip part 48*b* protrudes from the base part 48*a* is equivalent to the thickness T1 of the lip part 48*b* in the orthogonal direction K1 orthogonal to the protruding direction G1. Specifically, the length L1 of the lip part 48*b* is in a range of plus or minus 20% of the thickness T1 of the lip part 48*b* or is greater than this range.

Figure 10:
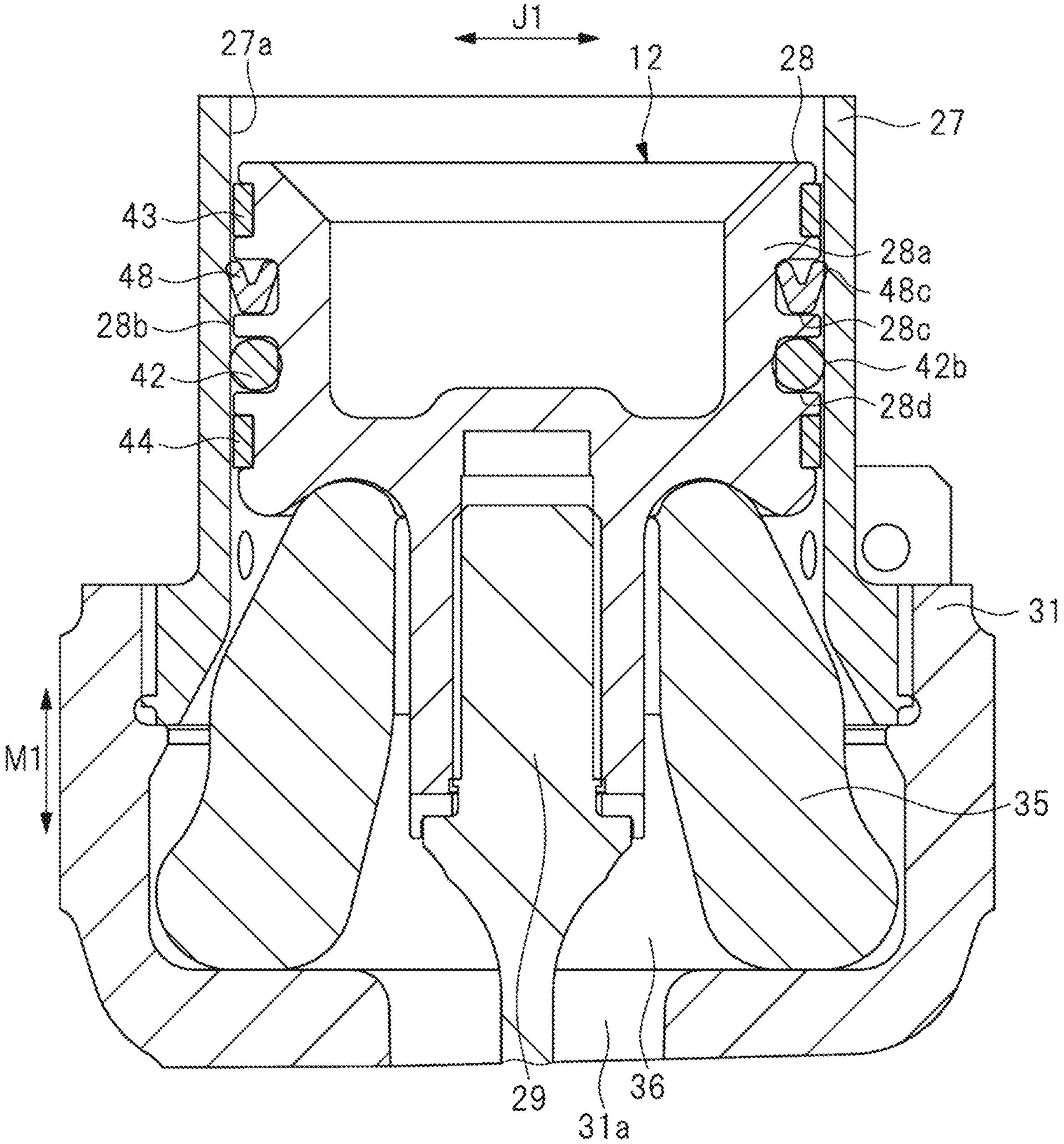
FIG. 10 is a partially enlarged cross-sectional view showing a structure in which a seal member of a first modification example is provided at the piston shown in FIG. 3.

As shown in FIG. 10, by arranging the V-ring 48 on the top dead center side of the piston part 28 to form a seal surface 48*c* at a contact spot with the inner wall 27*a* of the cylinder 27, the surface pressure can be further increased, and as a result, the sealing performance at a low temperature can be enhanced. Furthermore, by arranging the O-ring 42 on the bottom dead center side of the piston part 28, oil film breakage at room temperature can be reduced to secure the sealing performance by the lubricant (oil film). In other words, by arranging a seal member (O-ring 42) with a minimum surface pressure at room temperature, oil film breakage can be suppressed and the sealing performance can be secured. Accordingly, occurrence of air leakage can be suppressed, and the frequency for the operator to interrupt the driving work to replenish air can be reduced. That is, air leakage of the nailer 10 can be suppressed to use the nailer 10 for a long period of time. As a result, even in the case where the V-ring 48 is adopted instead of the X-ring 41, the convenience of the nailer 10 can be improved.

Figure 12:
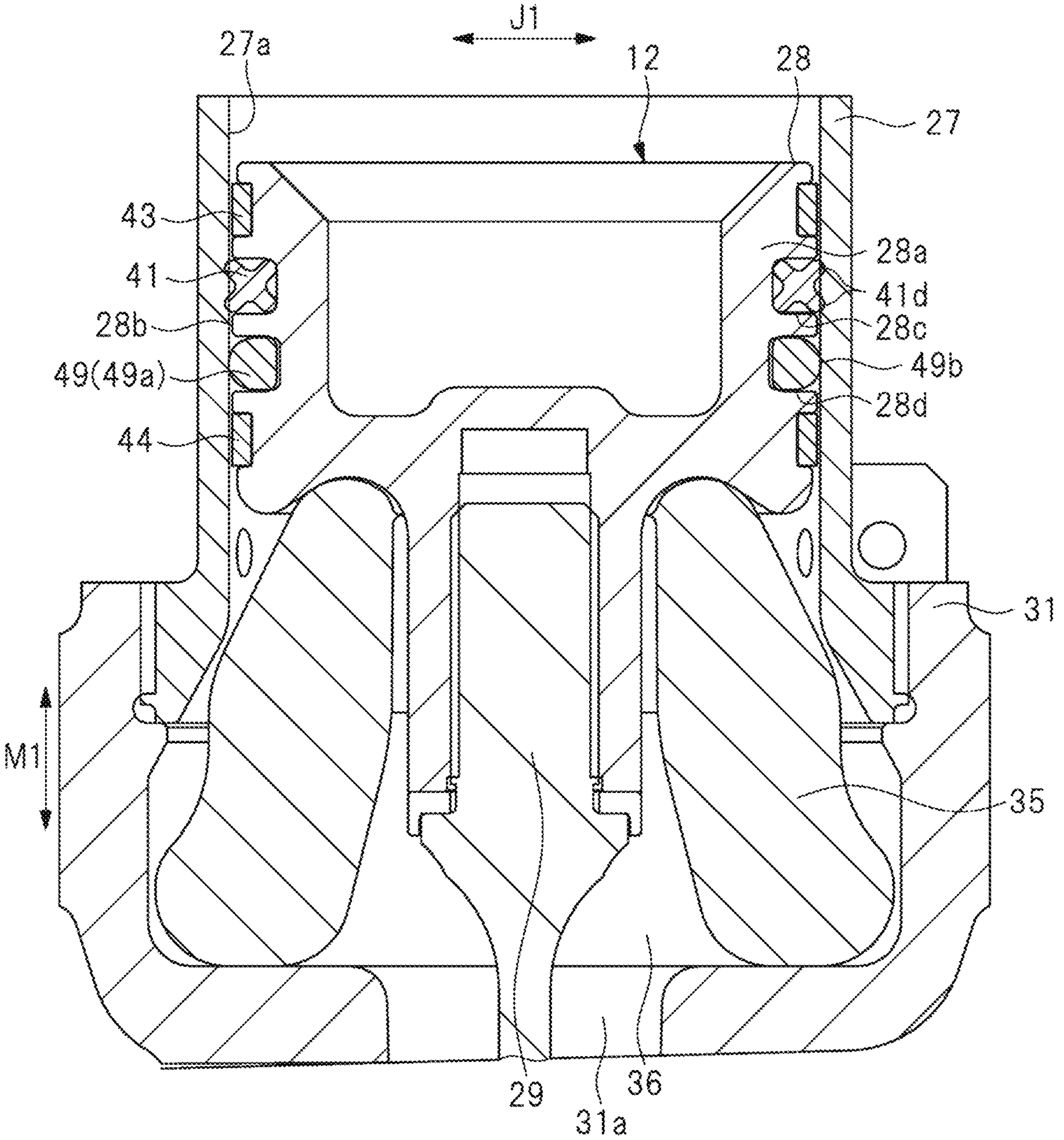
FIG. 12 is a partially enlarged cross-sectional view showing a structure in which a seal member (D-ring) of a second modification example is provided at the piston shown in FIG. 3.

Further, in a second modification example shown in FIG. 12, the X-ring 41 is arranged as the first seal member on the top dead center side of the sidewall 28*b* of the base member 28*a* of the piston part 28, and a D-ring 49 is adopted instead of the O-ring 42 as the second seal member on the bottom dead center side. By arranging the X-ring 41 on the top dead center side of the piston part 28, the surface pressure on the top dead center side can be further increased, and accordingly, the sealing performance at a low temperature can be enhanced. Furthermore, by arranging the D-ring 49 on the bottom dead center side of the piston part 28, oil film breakage at room temperature can be reduced to secure the sealing performance by the lubricant (oil film), in a manner similar to the case of the O-ring 42.

Similar to the O-ring 42, the D-ring 49 only includes a base part (second base part) 49*a* in a circular shape and does not include lip parts. Thus, at a seal surface 49*b* of the D-ring 49 at a contact spot with the cylinder 27, the surface pressure can be reduced at room temperature and oil film breakage of the lubricant can be suppressed. In other words, by arranging the X-ring 41 on the top dead center side and arranging the D-ring 49 on the bottom dead center side, oil film breakage can be suppressed and the sealing performance can be secured. Accordingly, occurrence of air leakage can be suppressed, and the frequency for the operator to interrupt the driving work to replenish air can be reduced. That is, air leakage of the nailer 10 can be suppressed to use the nailer 10 for a long period of time. As a result, even in the case where the D-ring 49 is adopted instead of the O-ring 42, the convenience of the nailer 10 can be improved.

The disclosure is not limited to the above embodiments and may be subjected to various modifications without departing from the spirit thereof. For example, in the above embodiments, the second seal member has been described as a seal member having a cross-sectional shape in a circular shape or a D shape, but the second seal member may also have a cross-sectional shape in a quadrangular shape such as a square or in an ellipse. Further, the positions of the X-ring 41 and the O-ring 42 may be reversed from the above embodiments, with the O-ring 42 arranged on the top dead center side of the X-ring 41. In that case, compared to the above embodiments, although the effect of enhancing the sealing performance of the X-ring 41 by the air pressure from the pressure chamber 26 is lowered, there is no change in the effect of holding the lubricant between the X-ring 41 and the O-ring 42, and air leakage caused by oil film breakage can be reduced. Further, even in this case, by increasing the tightening margin of the X-ring 41 more than in the above embodiments, the sealing performance of the X-ring 41 can be improved, and air leakage at a low temperature can be suppressed. The tightening margin of the O-ring 42 may also be increased to the same extent as that of the X-ring 41, and in that case as well, by holding the lubricant between the X-ring 41 and the O-ring 42, oil film breakage at the X-ring 41 and the O-ring 42 can be reduced, and the sealing performance is improved due to the increase in the tightening margin of the O-ring 42, so air leakage can be suppressed.

What is claimed is:

1. A work machine comprising:

a case part with hollow shape comprising a cylinder, the cylinder being in a tubular shape extending in a first direction and comprising an inner wall; and a piston part capable of moving in the first direction inside the cylinder, the piston part cooperating with the case part to define a pressure chamber inside the case part, and striking a fastener by moving to a first side in the first direction due to a pressure of a gas inside the pressure chamber, wherein the piston part comprises:

a base member comprising a sidewall facing the inner wall of the cylinder;

a first seal member attached to the base member to be interposed between the sidewall and the inner wall, wherein the first seal member is disposed between a first space at the first side of the first seal member in the first direction and a second space at a second side, opposite to the first side, of the first seal member in the first direction so as to seal between the first space and the second space;

a second seal member attached to the base member to be interposed between the sidewall and the inner wall, and arranged at a position different from the first seal member in the first direction, wherein the second seal member is disposed between a third space at the first side of the second seal member in the first direction, and a fourth space at the second side of the second seal member in the first direction so as to seal between the third space and the fourth space; and a slide ring attached to the base member for being interposed between the sidewall and the inner wall and arranged at a position different from the first seal member and the second seal member in the first direction, wherein, in a cross-sectional view at a cut plane parallel to the first direction, the first seal member comprises a first base part and a lip part standing from the first base part and contacting the cylinder, and in the cross-sectional view, the second seal member comprises a second base part and does not comprise a lip part standing from the second base part, wherein the base member is configured to move a slide part including the first seal member, the second seal member and the slide ring along the inner wall while the base member moves inside the cylinder.

2. The work machine according to claim 1, wherein an abutment force of the first seal member against the cylinder is greater than an abutment force of the second seal member against the cylinder.

3. The work machine according to claim 2, wherein a tightening margin of the first seal member against the cylinder is greater than a tightening margin of the second seal member against the cylinder.

4. The work machine according to claim 1, wherein the second seal member is arranged on only the first side in the first direction of the first seal member.

5. The work machine according to claim 1, wherein the first seal member is composed of a material with a mechanical strength higher than the second seal member.

6. The work machine according to claim 1, wherein the second seal member is composed of a material with a cold resistance higher than the first seal member.

7. The work machine according to claim 1, wherein in the cross-sectional view of the first seal member, the lip part is protruding outwardly from the first base part and inclined toward the second side in the first direction.

8. The work machine according to claim 1, wherein in the cross-sectional view of the first seal member, a thickness of the lip part is smaller than a short diameter of the first base part.

9. The work machine according to claim 1, wherein in the cross-sectional view of the first seal member, a length of the lip part in a protruding direction of the lip part is equivalent to a thickness of the lip part.

10. The work machine according to claim 1, wherein the piston part comprises a second slide ring attached to the base member for being interposed between the sidewall and the inner wall and arranged at a second position different from the first seal member, the second seal member and the slide ring in the first direction, and the first seal member and the second seal member are disposed between the slide ring and the second slide ring in the first direction.

11. The work machine according to claim 1, wherein the first seal member is hydrogenated nitrile rubber.

12. The work machine according to claim 1, wherein the second seal member is ethylene propylene rubber or nitrile rubber.

13. A work machine comprising:
a case part with hollow shape comprising a cylinder, the cylinder being in a tubular shape extending in a first direction and comprising an inner wall; and
a piston part capable of moving in the first direction inside the cylinder, the piston part cooperating with the case part to define a pressure chamber inside the case part, and striking a fastener by moving to a first side in the first direction due to a pressure of a gas inside the pressure chamber, wherein
the piston part comprises:
a base member comprising a sidewall facing the inner wall of the cylinder;
a first seal member attached to the base member to be interposed between the sidewall and the inner wall, wherein the first seal member is disposed between a first space at the first side of the first seal member in the first direction, and a second space at a second side, opposite to the first side, of the first seal member in the first direction so as to seal between the first space and the second space;
a second seal member attached to the base member to be interposed between the sidewall and the inner wall, and arranged on the first side in the first direction of the first seal member, wherein the second seal member is disposed between a third space at the first side of the second seal member in the first direction, and a forth space at the second side of the second seal member in the first direction so as to seal between the third space and the fourth space; and
a slide ring attached to the base member for being interposed between the sidewall and the inner wall and arranged at a position different from the first seal member and the second seal member in the first direction,
wherein an abutment force of the first seal member against the cylinder is greater than an abutment force of the second seal member against the cylinder, and
the base member is configured to move a slide part including the first seal member, the second seal member and the slide ring along the inner wall while the base member moves inside the cylinder.

14. The work machine according to claim 13, wherein a tightening margin of the first seal member against the cylinder is greater than a tightening margin of the second seal member against the cylinder.

* * * * *